(12) United States Patent
Jeong et al.

(10) Patent No.: US 6,389,022 B1
(45) Date of Patent: May 14, 2002

(54) METHOD FOR CONTROLLING THE ASYNCHRONOUS TRANSFER MODE CALL IN AN ATM SWITCHING SYSTEM

(75) Inventors: Je-Moon Jeong; Kyung-Geun Lee, both of Seoul (KR)

(73) Assignee: SamSung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/178,681

(22) Filed: Oct. 26, 1998

(30) Foreign Application Priority Data

Oct. 25, 1997 (KR) .......................................... 97-55001
Jul. 27, 1998 (KR) .......................................... 98-30111

(51) Int. Cl.[7] ............................................. H06L 12/28
(52) U.S. Cl. ................................. 370/395.2; 370/395.1
(58) Field of Search .............................. 370/389, 395.1, 370/395.2, 440, 237, 238, 351, 392

(56) References Cited

U.S. PATENT DOCUMENTS

| | | | |
|---|---|---|---|
| 4,956,839 A | | 9/1990 | Torii et al. |
| 5,493,566 A | | 2/1996 | Ljungberg et al. |
| 5,504,754 A | | 4/1996 | Grünenfelder |
| 5,600,795 A | | 2/1997 | Du |
| 5,663,947 A | * | 9/1997 | Wille-Fier et al. ....... 370/395.2 |
| 5,719,863 A | | 2/1998 | Hummel |
| 5,726,977 A | | 3/1998 | Lee |
| 5,787,072 A | | 7/1998 | Shimojo et al. |
| 6,125,123 A | * | 9/2000 | Furuno ..................... 370/395.2 |
| 6,240,102 B1 | * | 5/2001 | Asano ...................... 370/395.2 |
| 6,275,492 B1 | * | 8/2001 | Zhang ........................ 370/392 |

* cited by examiner

Primary Examiner—Salvatore Cangialosi
(74) Attorney, Agent, or Firm—Robert E. Bushnell, Esq.

(57) ABSTRACT

A method for controlling an asynchronous transfer mode (ATM) call pertaining to an asynchronous transfer mode switch for balancing and sharing the load is disclosed. The method features a step of requesting an asynchronous transfer mode access unit of the sending side, a step of requesting an asynchronous transfer mode access unit of the receiving side to set up a call, and a step of transferring a release or release-complete message to an asynchronous transfer mode switch of the sending side, if the asynchronous transfer mode switch of the receiving side fails in setting up the call because of the fault among the access units. And the method has a further step of searching the address of the next destination and requesting of an asynchronous transfer mode switch of the sending side for an asynchronous transfer mode access unit of the receiving side to set up the call, after receiving release or release-complete message. In the method a call connection message is transferred to the asynchronous transfer mode access unit of the sending side, if the call is set up and also a connection acknowledgment message about the call connection message is transferred to the asynchronous transfer mode switch of the sending side. And the method provides a communication service after the call connection.

20 Claims, 7 Drawing Sheets

| ATM NSAP ADDRESS (20 BYTE) | ACG NO. | PHYSICAL PORT INA (SWITCH,PORT) |
|---|---|---|
| 39.30.30.30.30....................30 | 1 | ( AS1, 1 ) |
| 39.30.30.30.30....................31 | 1 | ( AS1, n ) |
| 39.30.30.30.30....................32 | 0xff | ( AS1, n ) |
| 39.30.30.30.30....................33 | 2 | ( AS2, n+1 ) |
| 39.30.30.30.30....................34 | 2 | ( AS2, n+2 ) |
| 39.30.30.30.30....................35 | 2 | ( AS2, n+3 ) |
| 39.30.30.30.30....................36 | 2 | ( AS2, n+n ) |
| 39.30.30.30.30....................37 | 0xff | ( AS3, j ) |
| 39.30.30.30.30....................38 | 0xff | ( AS4, k ) |

FIG. 7

METHOD FOR CONTROLLING THE ASYNCHRONOUS TRANSFER MODE CALL IN AN ATM SWITCHING SYSTEM

CLAIM OF PRIORITY

This application makes reference to, incorporates the same herein, and claims all benefits accruing under 35 U.S.C. § 119 from an application entitled a Method For Controlling The Asynchronous Transfer Mode Call in an ATM Switching System earlier filed in the Korean Industrial Property Office on the 25th day of October 1997, and there duly assigned Serial No. 1997-55001, and on the 27th day of July 1998, and there duly assigned Serial No. 1998-30111, a copy of which is annexed hereto.

BACKGROUND OF THE INVENTION

1. Technical Field

The present invention relates to an asynchronous transfer mode (ATM) switching system, and more particularly to a method controlling an asynchronous transfer mode call in an asynchronous transfer mode switching system for balancing and sharing the load.

2. Related Art

In the field of high speed networking, asynchronous transfer mode (ATM) is a key component. Asynchronous transfer mode is a telecommunications technique for carriage of a complete range of user traffic, including voice, data, and video signals, on any user-to-network interface (UNI). The telecommunications technique known as asynchronous transfer mode (ATM) was defined by American National Standards Institute (ANSI) and International Telecommunications Union (ITU) standards.

American National Standards Institute is a nonprofit organization formed in 1918 to coordinate private sector standards development in the United States of America. The International Telecommunications Union is an international standards organization that is part of the United Nations. The International Telecommunications Union, formerly known as the International Telegraph and Telephone Consultative Committee (CCITT), comprises an international committee established to promote standards for the development of telephone, telegraph systems, and data networks and to create the environment for interworking between the networks of the different countries of the world.

Asynchronous transfer mode is extremely well suited to high speed networking. Asynchronous transfer mode technology can be used to aggregate user traffic from existing applications onto a single user-to-network interface (UNI), and to facilitate multimedia networking between high speed devices at high speeds, for example 150 megabits per second.

In general, packet-switching technologies are used to relay data traffic via an address contained within a packet. Asynchronous transfer mode is one of a class of such packet-switching technologies.

There are different types of asynchronous transfer mode switches. The term "switch fabric" refers to the method of data being switched from one node to another within a network. The term "cell" refers to a fixed-length unit of data traveling through the switch fabric. Cell switching breaks up data streams into small units that are independently routed through the switch. The routing occurs mostly in hardware through the switching fabric. The combination of cell switching and scaleable switching fabrics are key components of asynchronous transfer mode.

Exemplars of recent efforts in the art include U.S. Pat. No. 5,787,072 for a Flow Control Apparatus and Flow Control Method issued to Shimojo et al., U.S. Pat. No. 5,726,977 for Apparatus and Method for Determining a Network Node Congestion State in Order to Control the Congestion in an Atm Network issued to Lee, U.S. Pat. No. 5,504,754 for Method and Arrangement for the Load Testing of a Switch for Cell Structured Digital Data issued to Grünenfelder, U.S. Pat. No. 5,493,566 for a Flow Control System for Packet Switches issued to Ljungberg et al., U.S. Pat. No. 5,719,863 for Method And Arrangement For Fast Through-connect of Virtual Connections in ATM Communications System issued to Hummel, U.S. Pat. No. 5,600,795 for Local Network Operating in Asynchronous Transfer Mode (ATM) Generating Control Cell Containing Information about the User, Address oft he Station, and User-related Identification issued to Du, and U.S. Pat. No. 4,956,839 for ATM Switching System issued to Torii et al. The aforementioned patents are different from the present invention.

While these recent efforts provide advantages, I note that they fail to adequately provide an efficient method controlling an asynchronous transfer mode call in an asynchronous transfer mode switching system for balancing and sharing the load.

SUMMARY OF THE INVENTION

It is an object of the present invention to provide a method for controlling a call so that a plurality of different physical ports, which are connected to a plurality of different asynchronous transfer mode switching systems, may be sequentially utilized.

It is a further object of the present invention to provide a method for controlling a call in a switching device which enables the switching device to share and balance the load of a number of calls being handled by the switching device, to enhance performance of the switching device. The switching device can be an asynchronous transfer mode switching device.

To achieve an object of the present invention, a preferred embodiment of a method for controlling an asynchronous transfer mode call for balancing and sharing the load, according to the principles of the present invention, comprises a step of requesting of an asynchronous transfer mode access unit of the sending side, for an asynchronous transfer mode access unit of the receiving side to set up the call and a step of transferring a release or release-complete message to an asynchronous transfer mode switch of the sending side, if the asynchronous transfer mode switch of the receiving side fails in setting up the call because of the fault among the access units.

And the method further comprises a step of searching the address of the next destination and requesting of an asynchronous transfer mode switch oft he sending side for an asynchronous transfer mode access unit of the receiving side to set up the call, after receiving said release or release-complete message, transferring a call connection message to the asynchronous transfer mode access unit of the sending side, if said call is set up and a step of transferring a connection acknowledgment message about the call connection message to the asynchronous transfer mode switch of the sending side and a step of providing a communication service after the call connection.

To achieve these and other objects in accordance with the principles oft he present invention, as embodied and broadly described, the present invention provides a method comprising: first requesting that a communication link be established between a first end unit and a second end unit, said first requesting being performed by said first end unit when said first end unit contacts a first switch unit disposed between said first end unit and said second end unit; when said communication link fails to be established by a route passing through a first port, transmitting a release signal to said first switch unit, said first port coupling a second switch unit to said second end unit, said second switch unit being disposed between said first switch unit and said second end unit; when said release signal is received, first searching for an address of a second port and then second requesting that said communication link be established, said second requesting being performed by said first switch unit and not being performed by said first end unit, wherein said second port couples said second switch unit to said second end unit; and enabling said first end unit to communicate with said second end unit along said communication link.

To achieve these and other objects in accordance with the principles of the present invention, as embodied and broadly described, the present invention provides a method comprising: first requesting that a communication link be established between a first access unit and a second access unit by a route passing through a switching device, said first requesting being performed by said first access unit when said first access unit contacts a first switch unit, said first and second access units being coupled to said switching device but not being included within said switching device, said first switch unit being included within said switching device; when said communication link fails to be established by a route passing through a first port wherein said first port couples a second switch unit to said second access unit, transmitting a release signal to said first switch unit, said second switch unit being included within said switching device; when said release signal is received, first searching for an address of a second port and then second requesting that said communication link be established by a route passing through said second port, said second requesting being performed by said first switch unit and not being performed by said first access unit, wherein said second port couples said second switch unit to said second access unit; and enabling said first access unit to communicate with said second access unit along said communication link along said route passing through said second port.

To achieve these and other objects in accordance with the principles of the present invention, as embodied and broadly described, the present invention provides an apparatus comprising: a switching device routing signals along a plurality of paths; a plurality of switching units being installed in said switching device, said plurality of switching units including first and second switch units, said plurality of switching units enabling said switching device to route signals along said plurality of paths; a first communication unit being coupled to said switching device; a second communication unit being coupled to said switching device; a plurality of ports being installed in said switching device, said plurality of ports coupling said second communication unit with said switching device, said plurality of ports including first and second ports; said first communication unit first requesting that a communication link be established between said first communication unit and said second communication unit by a route passing through said switching device; when said communication link fails to be established by a route passing through said first port, said first switch unit first searching for an address of said second port and then second requesting that said communication link be established by a route passing through said second port, said second requesting being performed by said first switch unit and not being performed by said first communication unit; and said first communication unit communicating with said second communication unit through said switching device along said communication link by said route passing through said second port.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
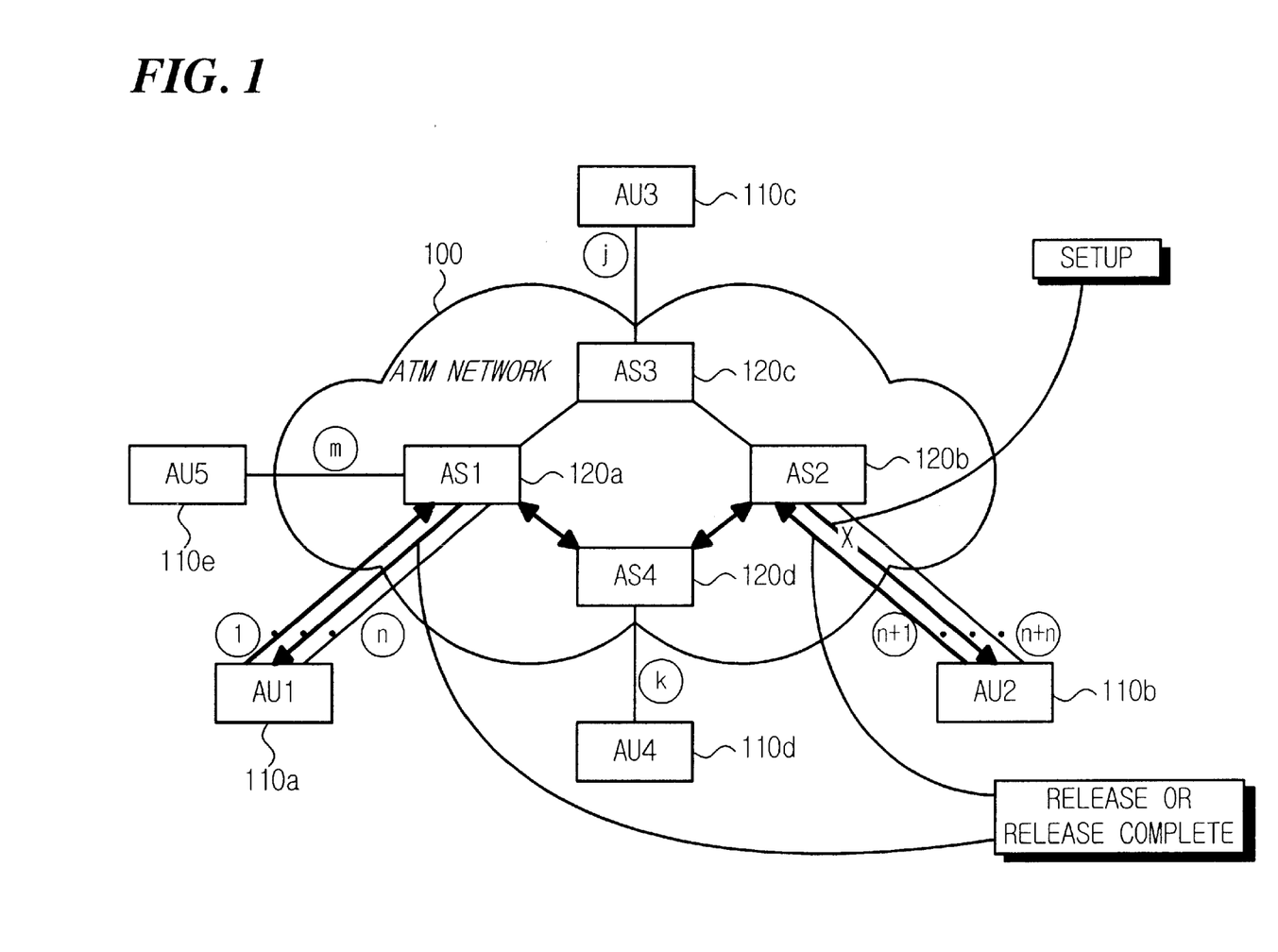
FIG. 1 illustrates a schematic diagram of setting up a call in case of failing in the connecting the physical ports in the asynchronous transfer mode network.

Turn now to FIG. 1, which illustrates a schematic diagram of setting up a call in case of failing in the connecting the physical ports in the asynchronous transfer mode network. FIG. 1 shows a protocol diagram in case of failing in connecting the physical ports in an asynchronous transfer mode. Also refer to FIG. 2, which illustrates a flow diagram of setting up a call in case of failing in the service between the asynchronous transfer mode switch (AS) of the receiving side and the asynchronous transfer mode access unit (AU) of the receiving side.

Figure 2:
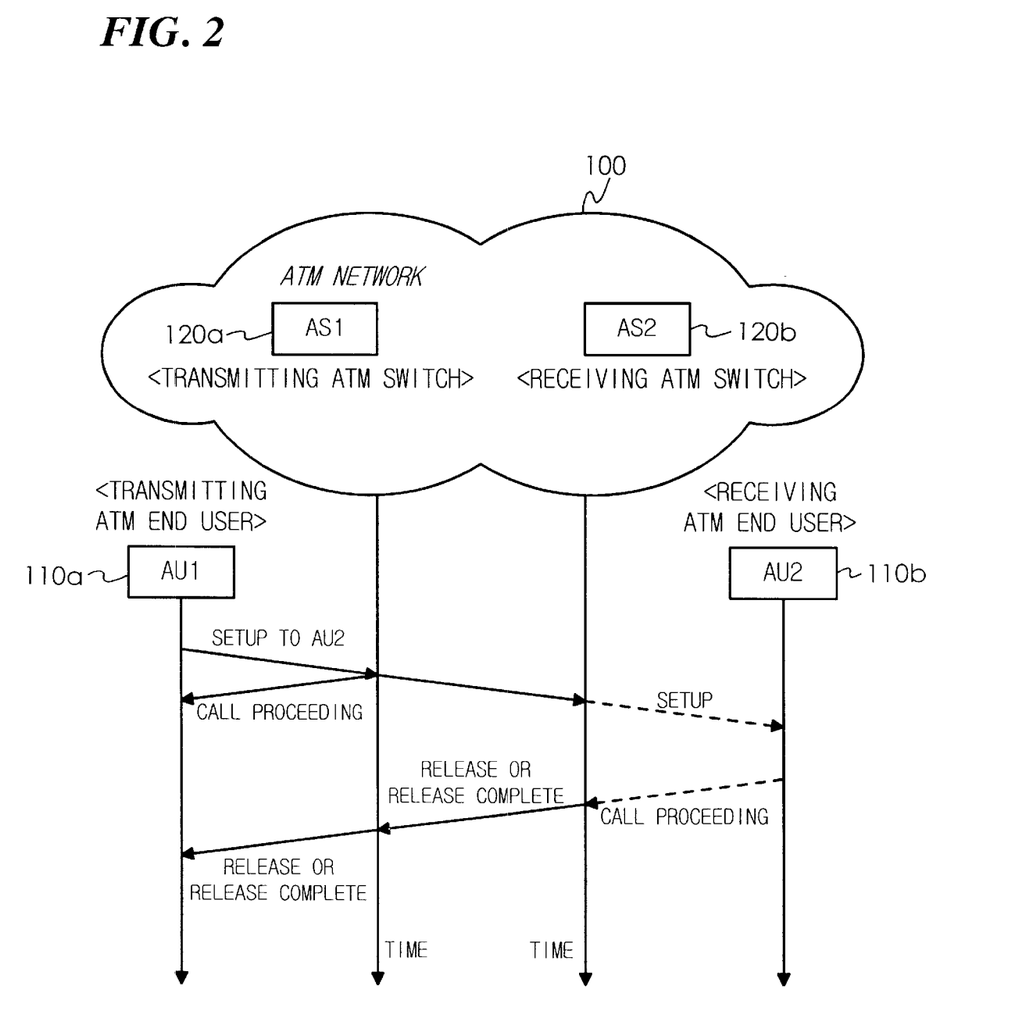
FIG. 2 illustrates a flow diagram of setting up a call in case of failing in the service between the asynchronous transfer mode switch of the receiving side and the asynchronous transfer mode access unit of the receiving side.

FIG. 2 shows a diagram failed in connecting the setup in case a failure occurred in the (n+1)th physical port between the asynchronous transfer mode switch of the receiving side and the asynchronous transfer mode access unit of receiving side in the asynchronous transfer mode network. An asynchronous transfer mode (ATM) network 100 is shown in FIGS. 1 and 2. The FIG. 1 also shows that ATM switch AS3 120c and ATM switch AS4 120d are included in ATM network 100. The FIG. 1 also shows that ATM access unit AU3 110c, ATM access unit AU4 110d, and ATM access unit AU5 110e are coupled to ATM network 100.

The address translation client (ATC) informs the switched virtual channel manager (SVCM) of the internal address (INA) converted from the destination asynchronous transfer mode network service access point (NSAP) which is transferred from the switched virtual channel manager.

The asynchronous transfer mode access unit (AU) of the sending side and the asynchronous transfer mode access unit of the receiving side utilize the UNI3.1/UNI4.0 recommended from the asynchronous transfer mode forum or from the International Telecommunication Union (ITU), or the broadband integrated service digital network (B-ISDN) defined from the Q.2931/Q.2971.

The users connect to each other through transmitting and receiving of the asynchronous transfer mode signaling protocol messages. The above messages include SETUP/, CALL PROCEEDING/, CONNECT/, CONNECT ACKNOWLEDGE/, RELEASE/, RELEASE COMPLETE.

Figure 3:
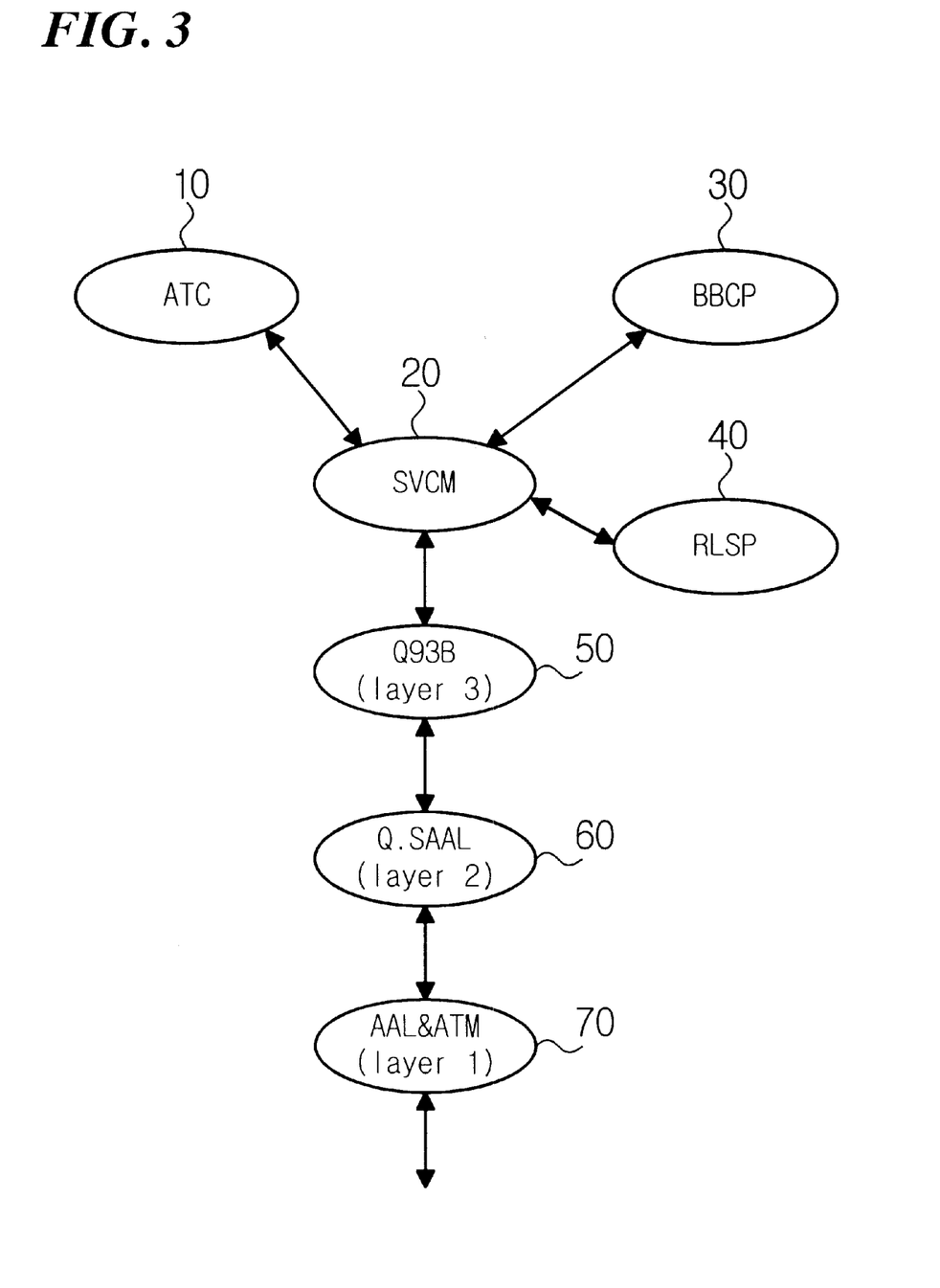
FIG. 3 illustrates a block diagram of the basic asynchronous transfer mode software applicable to the present invention, in accordance with the principles of the present invention.

With continued reference to FIGS. 1 and 2, turn now to FIG. 3, which illustrates a block diagram of the basic asynchronous transfer mode software applicable to the present invention, in accordance with the principles of the present invention. In FIG. 3, there is shown an address translation client (ATC) 10. With continued reference to FIGS. 1 through 3, turn to FIG. 5, which illustrates a mapping table of the alternate call group (ACG) addresses, in accordance with the principles of a preferred embodiment of the present invention.

The switched virtual channel manager (SVCM) 20 of FIG. 3 sets up the asynchronous transfer mode switched virtual channel connection following the procedure and the structure of the user-to-network interface (UNI) protocol messages defined in the asynchronous transfer mode forum UNI3.0/UNI4.0 or the Q.2931/Q.2971, and sets up and releases the connection admission control (CAC) and the call connection as the manager and controller of the whole resource.

The backbone connection control processor (BBCP) 30 of FIG. 3 manages and controls the call connection and the setup between the asynchronous transfer mode switch (AS) of the sending side and the asynchronous transfer mode switch of the receiving side. The routing and link state protocol (RLSP) 40 finds the optimized user cell path from the asynchronous transfer mode access unit of the sending side to the asynchronous transfer mode access unit of the receiving side.

The Q.93B 50 of FIG. 3 encodes and decodes the protocol message defined in the asynchronous transfer mode forum UNI3.0/UNI4.0, or the Q.2931/Q.2971, and exchanges the protocol message between the asynchronous transfer mode access unit (AU) and the asynchronous transfer mode switch (AS).

The Q.SALL 60 of FIG. 3 transfers the message of the Q.93B 50 and restores the errors according to the procedure and structure of the protocol message defined at the ITU Q.2110, Q.2130. The AAL5 & ATM 70 assembles and reassembles the data of the Q.93B into the data of the AAL5 type and asynchronous transfer mode type. The AAL is the asynchronous transfer mode adaption layer.

In the switched virtual channel connection of the asynchronous transfer mode, when the asynchronous transfer mode access unit of the sending side requested the asynchronous transfer mode switch of the sending side to set up the call connection, the call control according to the asynchronous transfer mode switch of the sending side could only request the called party number among the information elements contained in the connection setup message of the asynchronous transfer mode access unit of the sending side, in other words, the destination asynchronous transfer mode address and the mapped physical port, to connect the call. The physical port is located between the asynchronous transfer mode switch of the receiving side and the asynchronous transfer mode access unit of the receiving side.

Therefore, the call connection service may be failed, if the request for the call connection is increases, or if the resource capacity of the physical ports runs short because much data traffic is used at the physical port connected with the switch of the receiving side and the access unit of the receiving side, or if no more support for the asynchronous transfer mode connection is provided because of the failure of the physical link.

For example, in the FIG. 1 or FIG. 2, the asynchronous transfer mode access unit AU1 110a of the sending side and the asynchronous transfer mode switch AS1 120a are connected to the physical ports from number 1 to number n, and the asynchronous transfer mode access unit AU2 110b of the receiving side and the asynchronous transfer mode switch AS2 120b of the receiving side are connected to the physical ports from number n+1 to number n+n.

Figure 5:
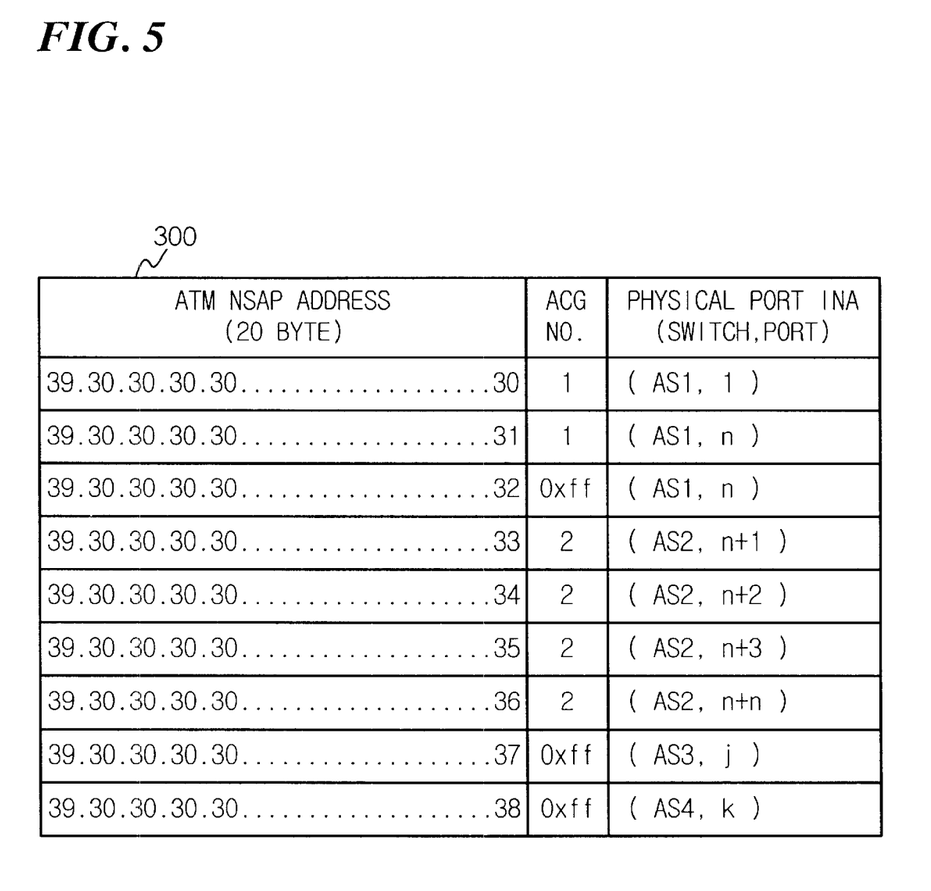
FIG. 5 illustrates a mapping table of the alternate call group addresses, in accordance with the principles of a preferred embodiment of the present invention.

If the destination asynchronous transfer mode address which the AU1 110a of FIG. 1 requires happens to be 39.30.30.30 . . . 33, as shown in FIG. 5, and is mapped to the physical port of number n+1, then the AU1 110a requests to connect the call to the physical port of number n+1. If the n+1 physical port is not properly working, or cannot support the data traffic requested by the transmitting access unit AU1 110a because of the lack of the resource capacity of the physical ports, the AU1 110a cannot connect the call to the AU2 110b.

Assuming that resource capacity of the physical ports are adequate and able to maintain a normal state, the transmitting AU1 110a must retry to request to connect the call to the destination asynchronous transfer mode address mapped with the n+2 physical port (for example, 39.30.30.30 . . . 34, as shown in FIG. 5), in order that the above AU1 110a may be connected to the AU2 110b.

Figure 4:
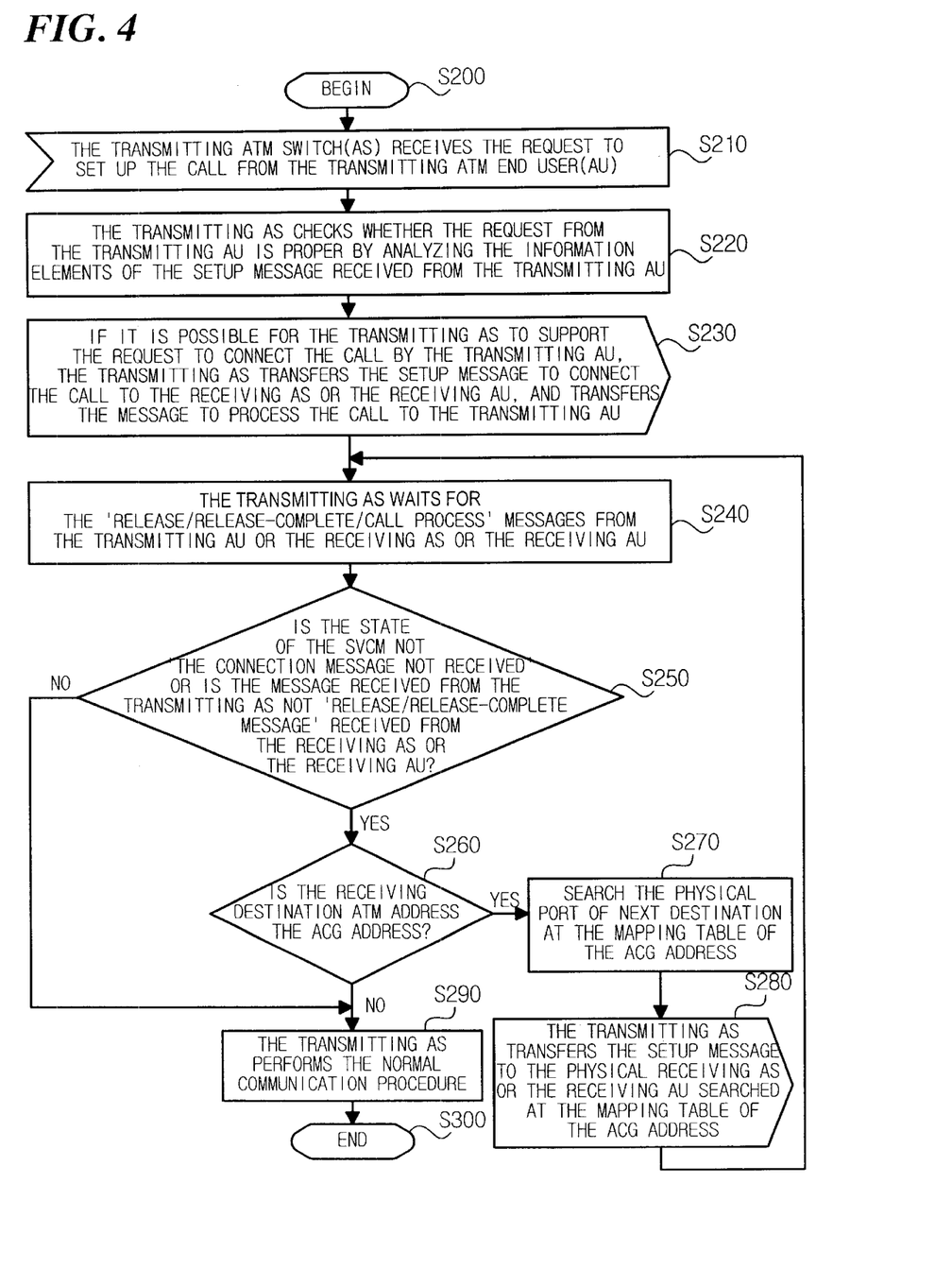
FIG. 4 illustrates a flow chart of the present invention according to the point of view of the asynchronous transfer mode switch of the sending side, in accordance with the principles of the present invention.
Figure 7:
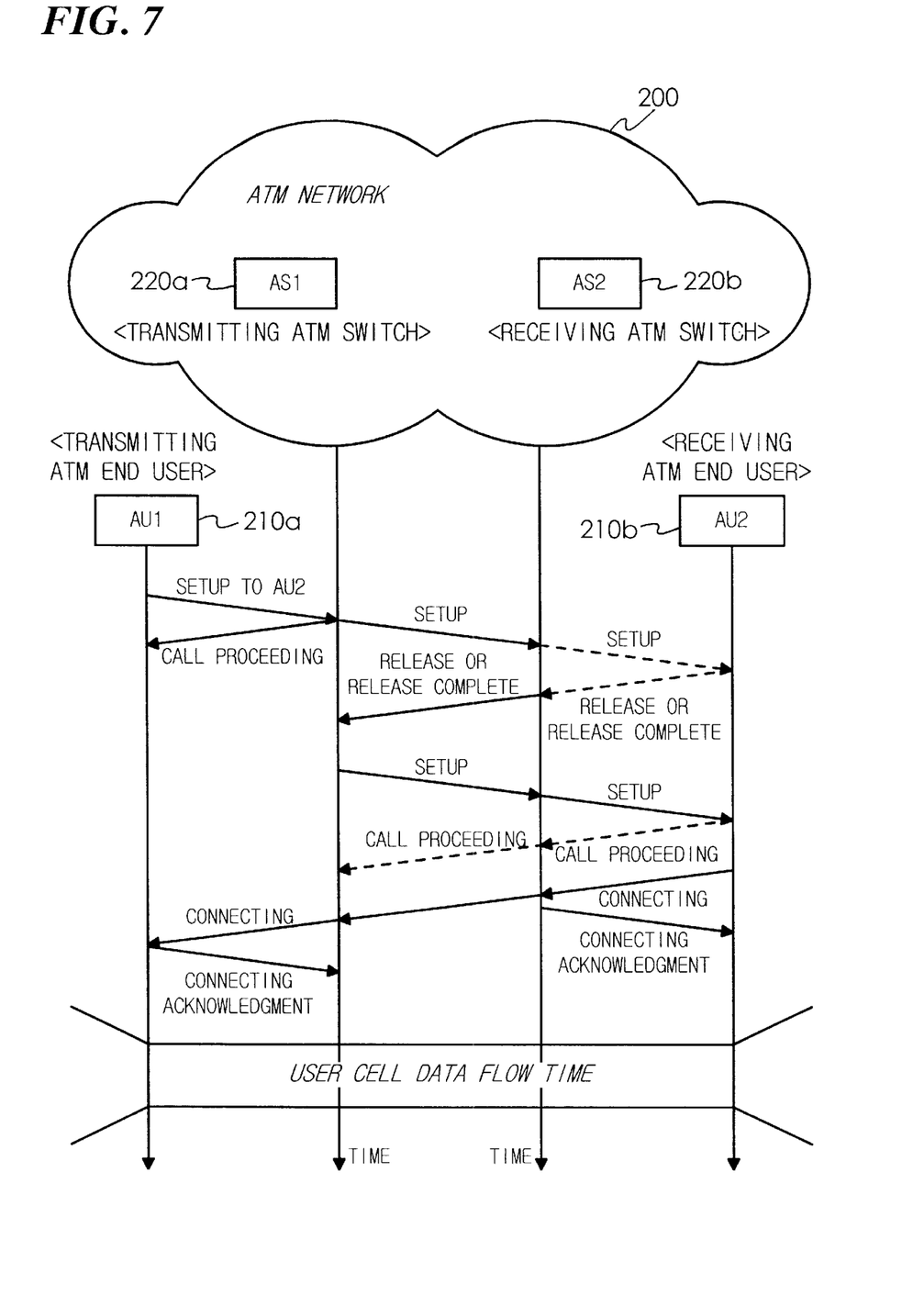
FIG. 7 illustrates a flow diagram of setting up the call in case of failing in the service between the asynchronous transfer mode switch of the receiving side and the asynchronous transfer mode access unit of the receiving side, in accordance with the principles of a preferred embodiment of the present invention.

A method for controlling the signaling call in the asynchronous transfer mode for balancing and sharing the load, in accordance with the principles of the present invention, is disclosed with reference to FIGS. 4 and 7. Turn now to FIG. 4, which illustrates a flow chart of the present invention according to the point of view of the asynchronous transfer mode switch of the sending side, in accordance with the principles of the present invention. With continued reference to FIG. 4, turn also to FIG. 7, which illustrates a flow diagram of setting up the call in case of failing in the service between the asynchronous transfer mode switch of the receiving side and the asynchronous transfer mode access unit of the receiving side, in accordance with the principles of a preferred embodiment of the present invention.

In FIG. 4, at step S200, the process according to the principles of the present invention begins. At step S210, the setup protocol message from the asynchronous transfer mode access unit of the sending side is transferred to the switched virtual channel manager (SVCM) of the asynchronous transfer mode switch of the sending side, with the switched virtual channel manager controlling the call. We note that the term "transmitting side" is the equivalent of the term "sending side".

In FIG. 4, at step S220, the switched virtual channel manager analyzes the information elements contained in the setup message, and checks the connection admission control (CAC) and the destination number so as to judge whether the request for connection by the asynchronous transfer mode access unit of the sending side is suitable or not.

In FIG. 4, at step S230, if the asynchronous transfer mode switch (AS) of the sending side can support the asynchronous transfer mode access unit of the sending side, then the asynchronous transfer mode switch of the sending side transfers the call processing message (including the virtual path identifier/virtual channel identifier) to the asynchronous transfer mode access unit of the sending side. In addition, the asynchronous transfer mode switch of the sending side transfers the setup message (to connect the call) to the asynchronous transfer mode switch of the receiving side or to the asynchronous transfer mode access unit of the receiving side.

The call processing message is the asynchronous transfer mode value of the asynchronous transfer mode user cell path to be used. In other words, the call processing message is the message to process the call. A virtual channel (VC) is a communication channel that provides for the sequential unidirectional transport of asynchronous transfer mode (ATM) cells. A virtual path (VP) is a unidirectional logical association or bundle of virtual channels (VCs). An unassigned cell is a cell identified by a standardized virtual path identifier (VPI) and virtual channel identifier (VCI) value, which has been generated and does not carry information from an application using the asynchronous transfer mode (ATM) layer service. The asynchronous transfer mode layer service corresponds to a capability of a layer and the layers beneath it that is provided to the upper layer entities at the boundary between that layer and the next higher layer.

In FIG. 4, at step S240, after requesting the asynchronous transfer mode switch of the receiving side to set up the connection in step S230, the asynchronous transfer mode switch of the sending side waits for the next step under the state of message receiving. In other words, the asynchronous transfer mode switch (AS) of the transmitting (sending) side waits for the "release/release-complete/call process" messages from the asynchronous transfer mode access unit (AU) of the transmitting side or from the asynchronous transfer mode switch (AS) of the receiving side or from the asynchronous transfer mode access unit (AU) of the receiving side.

In FIG. 4, at step S250, a determination is made in order to identify whether normal operating conditions exist. If it is determined that normal operating conditions exist, then the flow control proceeds to step S290. However, if it is determined that normal operating conditions do not exist, then the flow control proceeds to step S260, in order to share and balance the load.

At step S250, a determination is made as to the state of the switched virtual channel manager (SVCM). If the state of the switched virtual channel manager regarding the ATM switch (AS) of the sending side corresponds to the case where the first message from the ATM switch (AS) of the receiving side is not a "release" or a "release complete" message, then the system works according to the existing normal operation procedure and proceeds to step S290. The reason for checking the above "release" or "release complete" message is to check the received message.

At step S250, if the state of the switched virtual channel manager regarding the ATM switch (AS) of the sending side corresponds to the case where the first message from the ATM access unit (AU) of the receiving side is not a "release" or a "release complete" message, then the system works according to the existing normal operation procedure and proceeds to step S290. The reason for checking the above "release" or "release complete" message is to check the received message.

At step S250, if the state of the switched virtual channel manager regarding the ATM switch (AS) of the sending side corresponds to the case where the first message is a message from the ATM access unit (AU) of the sending side, then the system works according to the existing normal operation procedure and proceeds to step S290.

Otherwise, the flow control proceeds to step S260. At step S260, a determination is made as to whether the destination ATM address of the receiving side requested from the asynchronous transfer mode access unit (AU) of the sending side corresponds to the alternate call group (ACG) address. If the aforementioned destination ATM address of the receiving side corresponds to the alternate call group (ACG) address, then step S270 is performed. Otherwise, step S290 is performed.

At step S270, if the aforementioned destination ATM address of the receiving side corresponds to the alternate call group (ACG) address, the physical port of the next destination is searched at the alternate call group (ACG) address mapping table. At step S280, after the ATM switch (AS) of the sending side transfers the setup message to the aforementioned searched physical port, the flow control of the asynchronous transfer mode switch (AS) of the sending side returns to the step S240.

If the alternate call group (ACG) numbers are identical with each other in the alternate call group (ACG) address mapping table, they are recognized as the same asynchronous transfer mode access units. If the alternate call group (ACG) number is 0xff, it is recognized as an unregistered destination address.

FIG. 5 illustrates a mapping table of the alternate call group (ACG) addresses, in accordance with the principles of a preferred embodiment of the present invention. As described, the alternate call group number is connected to the network service access point (NSAP) address of the asynchronous transfer mode and assigned a physical port INA (internal address). Two physical addresses of the destination, that is, '39.30.30.30.30 . . . 30' and '39.30.30.30.30 . . . 31' are mapped with each alternate call group number '1', so as to re-set up to the physical port of the next destination, that is, '39.30.30.30.30 . . . 31', in case of failing in the setting up the call to the first '39.30.30.30.30 . . . 30' regarding the same alternate call group number '1'.

The asynchronous transfer mode switch of the sending side recognizes the alternate call group number, and the asynchronous transfer mode access unit of the receiving side tries the corresponding re-setup of the call.

The FIG. 5 includes a table 300 which shows that address (39,30,30,30, . . . ,31) corresponds to alternate call group number one and also shows that address (39,30,30,30, . . . ,31) is registered with alternate call group number one. Table 300 shows that address (39,30,30, 30, . . . ,32) corresponds to alternate call group number 0xFF. The fact that address (39,30,30,30, . . . ,32) corresponds to alternate call group number 0xFF in table 300 indicates that address (39,30,30,30, . . . ,32) is not registered with an alternate call group.

Figure 6:
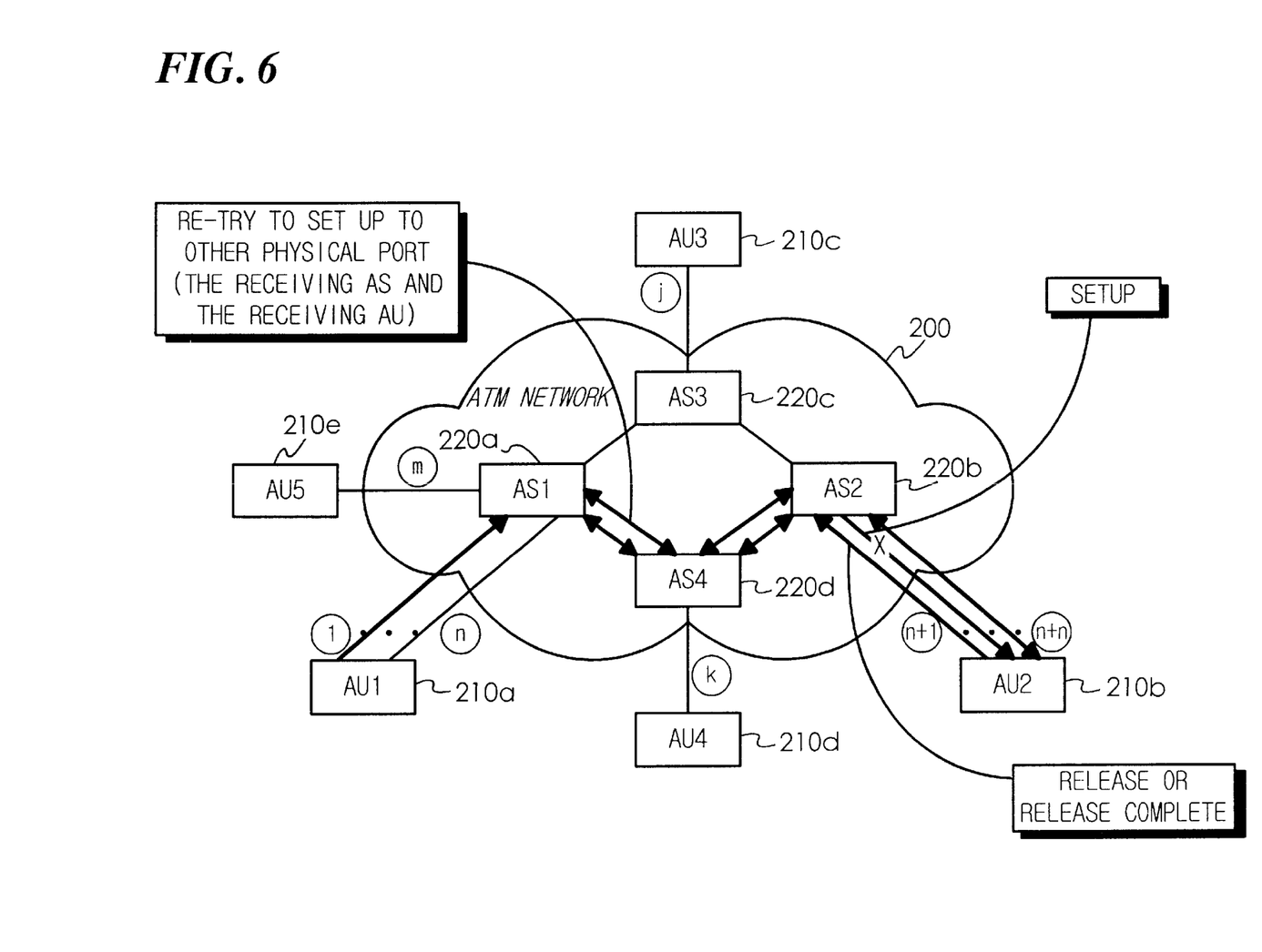
FIG. 6 illustrates a flow diagram of setting up the call in case of failing in the connecting the physical ports in the asynchronous transfer mode network, in accordance with the principles of a preferred embodiment of the present invention.

Turn now to FIG. 6, which illustrates a flow diagram of setting up the call in case of failing in the connecting the physical ports in the asynchronous transfer mode network, in accordance with the principles of a preferred embodiment of the present invention. Also, turn to FIG. 7 which illustrates a flow diagram of setting up the call in case of failing in the service between the asynchronous transfer mode switch of the receiving side and the asynchronous transfer mode access unit of the receiving side, in accordance with the principles of a preferred embodiment of the present invention.

The FIG. 6 shows that ATM switch AS1 220*a*, ATM switch AS2 220*b*, ATM switch AS3 220*c*, and ATM switch AS4 220*d* are included in ATM network 200. The FIG. 6 also shows that five asynchronous transfer mode access units are coupled to the asynchronous transfer mode network 200. The five ATM access units coupled to the ATM network 200 are ATM access unit AU1 210*a*, ATM access unit AU2 210*b*, ATM access unit AU3 210*c*, ATM access unit AU4 210*d*, and ATM access unit AU5 210*e*.

Referring to FIGS. 6 and 7, the first destination asynchronous transfer mode address requesting by the AU1 210*a* (the asynchronous transfer mode access unit of the sending side) is 39.30.30.30.30 . . . 30, and the alternate call group number is '1', and the physical port internal address (INA) is (AS1, 1) according to the alternate call group mapping table in FIG. 5. The asynchronous transfer mode switch of the sending side AS1 tries the call, and transfers the setup message to the asynchronous transfer mode switch of the receiving side AS2, concurrently transferring the call processing message to the AU1 again.

Though the AS2 transferred the setup message to the AU2, but, in case of failing in the connection with the condition of the first transmit because of the failure between the AS2 and the AU2, the AS2 can transfer the release or release-complete message to the AS1.

The above AS1 transfers the setup message to the asynchronous transfer mode access unit of the receiving side again through the AS2, not transferring the message to the asynchronous transfer mode access unit of the sending side again, and transfers the call processing message corresponding to the setup message to the AS1. If the asynchronous transfer mode network service access point (NSAP) address is '39.30.30.30.30 . . . 30' and the call failed in connecting to this address, the AS1 then tries to connect to the next asynchronous transfer mode network service access point address '39.30.30.30.30 . . . 31' in the same alternate call group number.

If succeeding in connecting the call to the above address, the AS1 connects the asynchronous transfer mode access unit of the sending side to the call. And the asynchronous transfer mode access unit of the sending side transfers the connection acknowledgment message to the AS1. In the end, the connection between the asynchronous transfer mode access unit of the sending side and the asynchronous transfer mode access unit of the receiving side enables the communication. And if all the physical ports works normally, the AU1 tries the destination physical ports sequentially.

Therefore, the present invention provokes the balancing and sharing of the load between the physical ports.

The foregoing paragraphs describe the details of a method for controlling the asynchronous transfer mode call in an asynchronous transfer mode switching system for balancing and sharing the load. More specifically, the present invention relates to a method utilizing a plurality of physical ports as a logical group port for balancing and sharing the load.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method comprising:

first requesting that a communication link be established between a first end unit and a second end unit, said first requesting being performed by said first end unit when said first end unit contacts a first switch unit disposed between said first end unit and said second end unit;

when said communication link fails to be established by a route passing through a first port, transmitting a release signal to said first switch unit, said first port coupling a second switch unit to said second end unit, said second switch unit being disposed between said first switch unit and said second end unit;

when said release signal is received, first searching for an address of a second port and then second requesting that said communication link be established, said second requesting being performed by said first switch unit and not being performed by said first end unit, wherein said second port couples said second switch unit to said second end unit; and enabling said first end unit to communicate with said second end unit along said communication link.

2. The method of claim 1, wherein said release signal is selected from among a release message and a release complete message.

3. The method of claim 1, wherein said first and second switch units correspond to an asynchronous transfer mode switching device.

4. The method of claim 3, wherein said first and second end units are coupled to said asynchronous transfer mode switching device.

5. The method of claim 1, wherein said searching is performed by said first switch unit.

6. The method of claim 1, wherein said first switch unit performs said searching by accessing a plurality of addresses corresponding to ports coupling said second switch unit and said second end unit, said plurality of addresses corresponding to alternate call group two and being registered with said alternate call group two.

7. The method of claim 6, wherein a first address (39,30, 30,30, . . . ,30) and a second address (39,30,30,30, . . . ,31) correspond to alternate call group one and are registered with said alternate call group one.

8. The method of claim 6, wherein addresses corresponding to alternate call group 0xFF are not registered with alternate call group 0xFF.

9. The method of claim 1, wherein said first searching for an address and said second requesting that said communication link be established further comprise:

determining whether said second switch unit received said connection signal; and determining whether said second end unit received said connection signal.

10. The method of claim 1, wherein said first searching for an address and said second requesting that said communication link be established further comprise:

determining whether a message transmitted from said second switch unit corresponds to said release signal; and determining whether a message transmitted from said second end unit corresponds to said release signal.

11. The method of claim 1, further comprising:

when said communication link is established, transmitting a connection signal to said first end unit; and transmitting a connection acknowledgment signal to said first switch unit in response to said connection signal.

12. A method comprising:

first requesting that a communication link be established between a first access unit and a second access unit by a route passing through a switching device, said first requesting being performed by said first access unit when said first access unit contacts a first switch unit, said first and second access units being coupled to said switching device but not being included within said switching device, said first switch unit being included within said switching device;

when said communication link fails to be established by a route passing through a first port wherein said first port couples a second switch unit to said second access unit, transmitting a release signal to said first switch unit, said second switch unit being included within said switching device;

when said release signal is received, first searching for an address of a second port and then second requesting that said communication link be established by a route passing through said second port, said second requesting being performed by said first switch unit and not being performed by said first access unit, wherein said second port couples said second switch unit to said second access unit; and enabling said first access unit to communicate with said second access unit along said communication link along said route passing through said second port.

13. The method of claim 12, wherein said switching device corresponds to an asynchronous transfer mode switching device.

14. The method of claim 13, wherein said searching is performed by said first switch unit.

15. The method of claim 13, further comprising:

when said communication link is established, transmitting a connection signal to said first access unit; and transmitting a connection acknowledgment signal to said first switch unit in response to said connection signal.

16. The method of claim 13, further comprising:

determining whether said second switch unit received said connection signal;

determining whether said second access unit received said connection signal;

determining whether a message transmitted from said second switch unit corresponds to said release signal; and determining whether a message transmitted from said second access unit corresponds to said release signal.

17. An apparatus comprising:

a switching device routing signals along a plurality of paths;

a plurality of switching units being installed in said switching device, said plurality of switching units including first and second switch units, said plurality of switching units enabling said switching device to route signals along said plurality of paths;

a first communication unit being coupled to said switching device;

a second communication unit being coupled to said switching device;

a plurality of ports being installed in said switching device, said plurality of ports coupling said second communication unit with said switching device, said plurality of ports including first and second ports;

said first communication unit first requesting that a communication link be established between said first communication unit and said second communication unit by a route passing through said switching device;

when said communication link fails to be established by a route passing through said first port, said first switch unit first searching for an address of said second port and then second requesting that said communication link be established by a route passing through said second port, said second requesting being performed by said first switch unit and not being performed by said first communication unit; and said first communication unit communicating with said second communication unit through said switching device along said communication link by said route passing through said second port.

18. The apparatus of claim 17, such that when said communication link is established, a connection signal is transmitted to said first communication unit; and a connection acknowledgment signal is transmitted to said first switch unit in response to said connection signal.

19. The apparatus of claim 17, wherein said switching device corresponds to an asynchronous transfer mode switching device.

20. The apparatus of claim 17, wherein said first switch unit performs said searching by accessing a plurality of addresses corresponding to said plurality of ports.

* * * * *